Nov. 28, 1933.  S. SWITZER  1,936,973
VEHICLE SEAT
Filed July 20, 1932    4 Sheets-Sheet 1
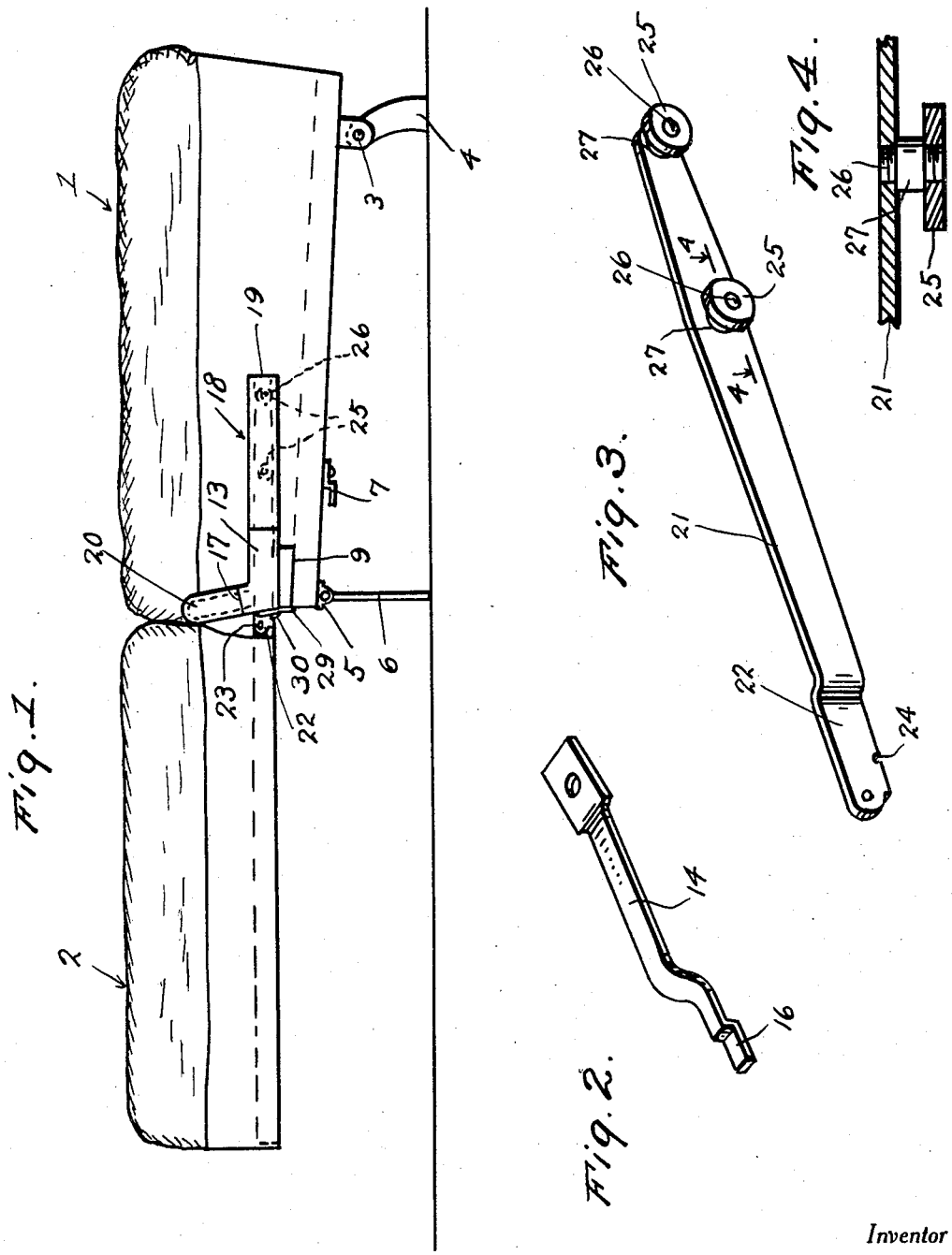
Inventor
Sam Switzer
By Clarence A. O'Brien
Attorney Nov. 28, 1933.　　　S. SWITZER　　　1,936,973
VEHICLE SEAT
Filed July 20, 1932　　　4 Sheets-Sheet 2
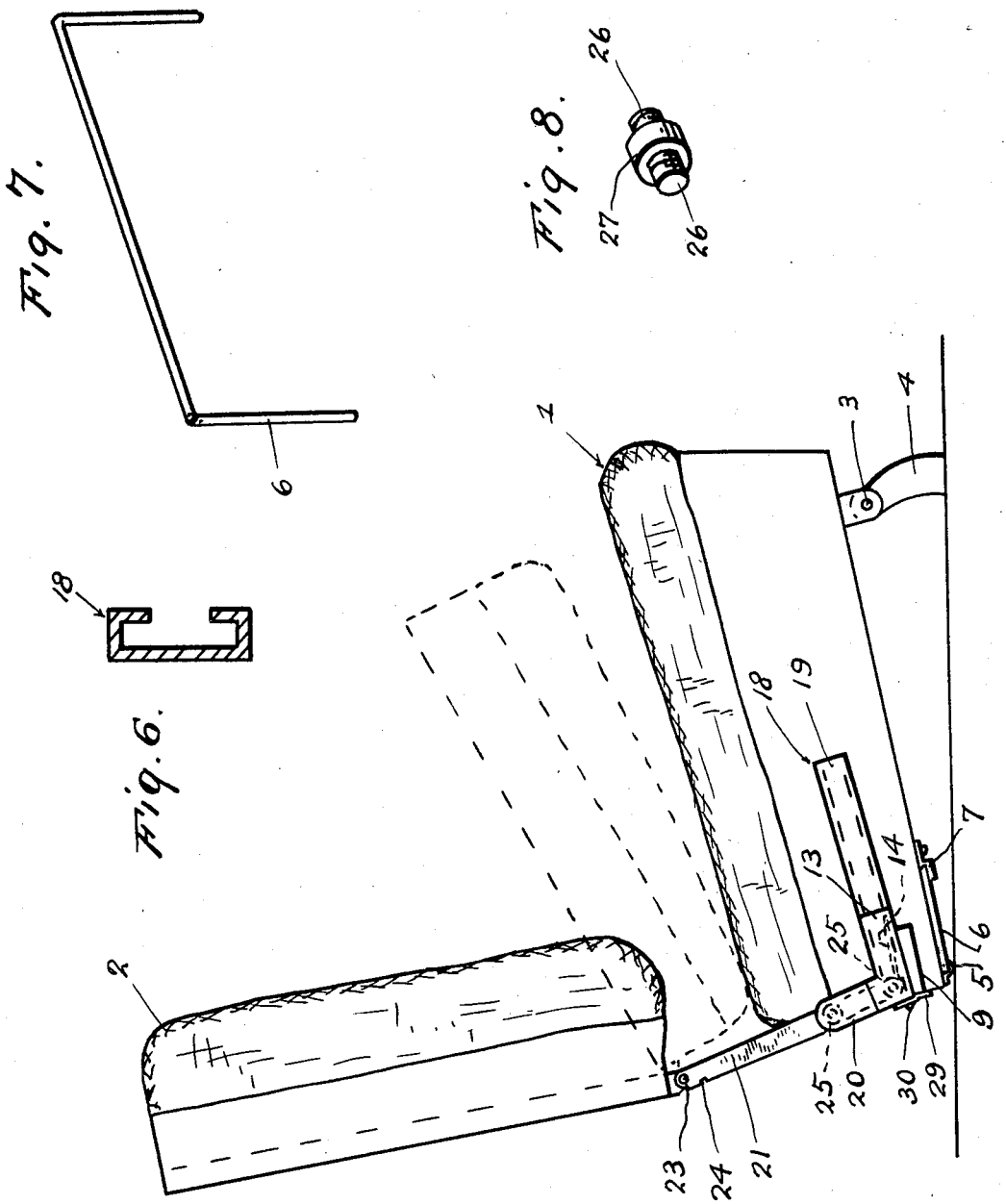
Inventor
Sam Switzer
By Clarence A. O'Brien
Attorney

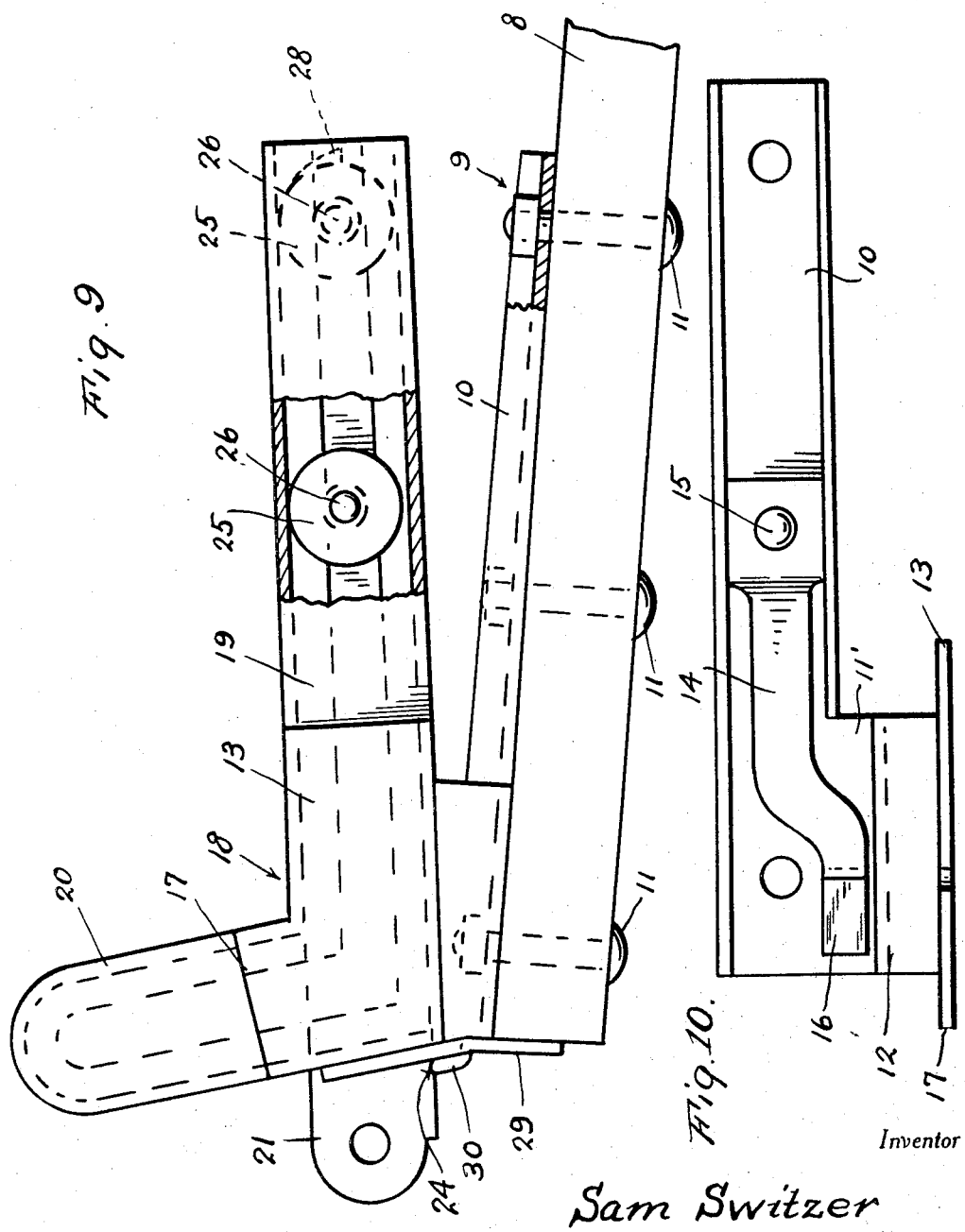

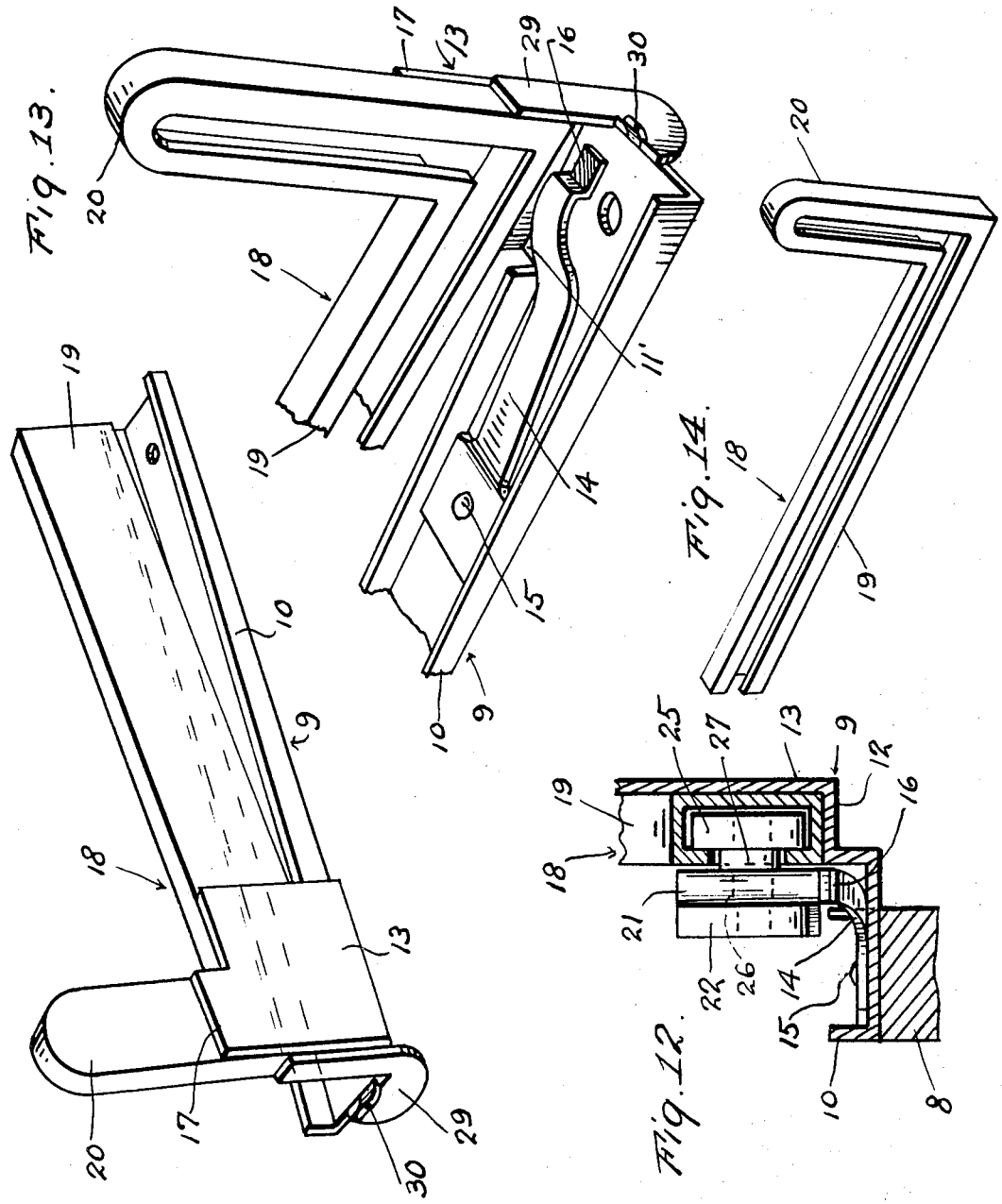

Patented Nov. 28, 1933

1,936,973

UNITED STATES PATENT OFFICE 1,936,973

VEHICLE SEAT

Sam Switzer, Casper, Wyo.

Application July 20, 1932. Serial No. 623,632

6 Claims. (Cl. 155—7)

The present invention relates to seats in general and more particularly to new and useful improvements in the front seats of automobiles and has for its primary object to provide, in a manner as hereinafter set forth, a seat of this character embodying a novel construction, combination and arrangement of parts through the medium of which the seat may be expeditiously converted into a bed in conjunction with the usual rear seat of the automobile.

Another important object of the invention is to provide a vehicle seat of the aforementioned character including novel means for mounting the back of said seat for use in an upright or horizontal position, said back, when in the latter position, being substantially flush with the horizontal portion of the seat.

Other objects of the invention are to provide a vehicle seat of the character described which will be simple in construction, strong, durable, efficient and reliable in use, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation, showing a seat in accordance with this invention adjusted for use as a bed.

Figure 2 is a detail view in perspective of the spring latch which functions when the seat back is in raised position.

Figure 3 is a detail view in perspective of the sliding and swinging bar.

Figure 4 is a detail view in horizontal section, taken substantially on the line 4—4 of Figure 3.

Figure 5 is a view in side elevation, showing the seat in accordance with the present invention with the back in upright position.

Figure 6 is a detail view in transverse section through the track.

Figure 7 is a detail view in perspective of the swinging seat supporting means.

Figure 8 is a detail view in perspective of one of the roller supporting pins.

Figure 9 is a view principally in side elevation and partially in section of the back mounting means.

Figure 10 is a detail view in top plan of the track supporting bracket.

Figure 11 is a detail view in perspective, showing the supporting bracket and the track mounted thereon.

Figure 12 is a detail view in vertical transverse section through the supporting bracket, the track thereon and showing the sliding and swinging member mounted in the track.

Figure 13 is a detail view in perspective showing a portion of the supporting bracket and the track mounted thereon.

Figure 14 is a detail view in perspective of the track.

Referring now to the drawings in detail, it will be seen that the reference numeral 1 designates generally a seat having a back 2. The seat 1 is hingedly mounted, as at 3, to swing in a vertical plane on the front supporting legs 4. Journaled for swinging movements, as in bearings 5 beneath the rear portion of the seat 1 is a substantially U-shaped support 6 providing legs for supporting the rear portion of the seat in raised position when said seat is to be converted into a bed, as seen in Figure 1 of the drawings. Suitable clips 7 are provided beneath the seat 1 for securing the supporting member 6 in raised or inoperative position, as seen in Figure 5 of the drawings.

Mounted horizontally on the rear portions of the longitudinal side members 8 of the frame of the seat 1 are brackets which are designated generally by the reference numeral 9. The brackets 9 each includes an elongated, substantially channel-shaped, apertured bar 10 which is secured in position by nut equipped bolts 11. The rear portion of the bar 10 is provided with an integral, lateral extension 11 which projects through the upholstery of the seat 1 and is provided with an upwardly offset, inclined flange 12 from which rises a vertical side member 13. A resilient latch 14 is secured at one end, as at 15, to an intermediate portion of the bar 10 and is provided with a laterally offset free end portion 16 which is disposed above the portion 11 of the bracket 9, for a purpose which will be presently set forth. The vertical member 13 of the bracket 9 includes an upstanding rear portion 17.

Rigidly secured, as by welding, on the flange 12 of each bracket 9 is an angular track which is designated generally by the reference numeral 18, said track being substantially C-shaped in transverse section and including comparatively long and short legs 19 and 20, respectively. The inclination of the flange 12 gives the track 18 the correct position or inclination. The leg 19 of the track 18 is open at its free end while the upstanding, comparatively short leg 20 is closed at its free end.

The reference numeral 21 designates a metallic bar having a laterally offset end portion 22 hingedly connected with the lower portion of the back 2, as at 23. The portion 22 of the bar 21 is provided with a notch 24, the purpose of which will be presently set forth. The bar 21 is mounted for travel on the track 18 through the medium of rollers 25 which are mounted laterally on said bar and operable in the track. Pins 26 project laterally from the bar 21 at spaced points and the rollers 25 are journaled thereon. The pins 26 are provided with enlarged intermediate portions 27 for spacing the rollers 25 from the bar 21. The enlargements 27 of the pins 26 may be in the form of washers or collars, if desired. Projecting from the forward end of the bar 21 is a lug 28 which is engageable by the portion 16 of the resilient latch 14 for releasably securing the bar in an upright position, as indicated in Figure 5 of the drawings.

Secured, as by welding, to the rear end portion of each bracket 9 is a substantially J-shaped plate 29 having projecting from a lower portion thereof a rearwardly and upwardly curved lip 30 which is engageable in the notch 24 of the bar 21 for preventing forward or rearward movement of said bar when the back 2 is in lowered position.

In use, when it is desired to convert the seat into a bed, the supporting member 6 is disengaged from the clips 7 and swung downwardly, the rear of the seat 1 being raised to a substantially horizontal position and being supported by the member 6. Then, a suitable instrument, such as a length of heavy wire or a screw-driver, is used to depress the resilient latches 14 on the bar portions 10 of the brackets 9 for disengaging said latches from the lugs 28 on the bars 21. The back 2 of the seat is then swung forwardly, as indicated in broken lines in Figure 5 of the drawings, and pressure is then exerted thereon in the proper direction for causing the narrow released bars 21 to swing downwardly to a substantially horizontal position, the rollers 25, of course, traveling in the tracks 18. The rollers travel from the upper legs 20 of the tracks 18, as seen in Figure 5 of the drawings, to the lower or horizontal legs 19 of said tracks, as illustrated to advantage in Figure 9 of the drawings. As previously stated, the lips 30 of the plates 29 engage in the notches 24 of the bars 21 for preventing forward or rearward movement of said bars when in lowered position. To raise the back 2, the movement of said back is substantially reversed and as the bars 21 swing to an upright position, the resilient latches 14 operatively engage the lugs 28 for securing said bars 21 in raised position.

It is believed that the many advantages of a vehicle seat constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. A vehicle seat comprising a frame, a back, brackets mounted on the frame, angular tracks mounted on the brackets and including legs extending in horizontal and vertical direction, bars connected to the back, rollers journaled on the bars and operable on the tracks for mounting said bars for sliding and swinging movement on said tracks whereby said back and said bars may be disposed in either a horizontal or vertical position, lugs on said bars, and resilient latches mounted on the brackets and engageable with said lugs for releasably securing said bars in one of said positions.

2. A vehicle seat comprising a frame, a back, brackets mounted on the frame, tracks rigidly mounted on the brackets and including comparatively long and short legs extending respectively in horizontal and vertical directions, bars connected, at one end, to the back, and spaced rollers journaled on one side of said bars and operable in the tracks for mounting said bars for sliding and swinging movement on the tracks whereby said back and bars may be disposed in either a horizontal or vertical position.

3. A vehicle seat comprising a frame, a back, brackets mounted on the frame, angular tracks of substantially C-shaped transverse section rigidly mounted on the brackets and including comparatively long and short legs extending respectively in horizontal and vertical directions, bars connected, at one end, to the back, and spaced rollers journaled on one side of each of said bars and operable in the tracks for mounting said bars for sliding and swinging movement on the tracks whereby said back and said bars may be disposed in either a horizontal or vertical position, lugs on one end of the bars, and resilient latches on the brackets engageable with the lugs for releasably securing the bars in one of said positions.

4. A vehicle seat comprising a frame, a back, brackets mounted on the frame, said brackets including a lateral extension and an upwardly offset inclined flange on the outer end of the extension, the brackets further including an upstanding member on the outer end of the flange, angular tracks of substantially C-shaped transverse section fixed on the inclined flanges in side abutting engagement with the upstanding members and including legs extending in horizontal and vertical directions, bars connected, at one end, to the back, and rollers journaled on one side of each of said bars and operable in the tracks for mounting the bars for sliding and swinging movement on said tracks whereby said back and said bars may be disposed in either a horizontal or vertical position.

5. A vehicle seat comprising a frame, a back, brackets mounted on the frame, said brackets including a lateral extension and an upwardly offset inclined flange on the outer end of the extension, the brackets further including an upstanding member on the outer end of the flange, angular tracks of substantially C-shaped transverse section fixed on the inclined flanges in side abutting engagement with the upstanding members and including legs extending in horizontal and vertical directions, bars connected, at one end, to the back, and rollers journaled on one side of each of said bars and operable in the tracks for mounting the bars for sliding and swinging movement on said tracks whereby said back and said bars may be disposed in either a horizontal or vertical position, the bars having notches therein, and lips on the brackets engageable in the notches for retaining the bars against longitudinal movement when in one of said positions.

6. A vehicle seat comprising a frame, a back, brackets mounted on the frame, said brackets including a lateral extension and an upwardly offset inclined flange on the outer end of the extension, the brackets further including an upstanding member on the outer end of the flange, angular tracks of substantially C-shaped transverse section fixed on the inclined flanges in side abutting engagement with the upstanding members and including legs extending in horizontal and vertical directions, bars connected, at one end, to the back, and rollers journaled on one side of each of the bars and operable in the tracks for mounting the bars for sliding and swinging movement on said tracks whereby said back and said bars may be disposed in either a horizontal or vertical position, the bars having notches therein, and lips on the brackets engageable in the notches for retaining the bars against longitudinal movement when in one of said positions, lugs on one end of the bars, and resilient latches mounted on the brackets and engageable with the lugs for releasably securing the bars in the other of said positions.

SAM SWITZER.